US005365494A

United States Patent [19]

Lynch

[11] Patent Number: 5,365,494

[45] Date of Patent: Nov. 15, 1994

[54] RADIO ALARM CLOCK WITH REMINDER CAPABILITY

[76] Inventor: Mike Lynch, 7261 Parklane, Algonac, Mich. 48001

[21] Appl. No.: 192,586

[22] Filed: Feb. 7, 1994

[51] Int. Cl.[5] .................... G04B 47/00; G04B 23/02; H04B 1/16

[52] U.S. Cl. .................... 368/10; 368/41; 368/72; 455/181.1; 455/344

[58] Field of Search .................... 368/10, 41–43, 368/47, 72–74, 250, 251; 455/140, 141, 181.1, 231.1, 344

[56] References Cited

U.S. PATENT DOCUMENTS 4,306,294 12/1981 Hashimoto et al. .................... 364/705

4,315,332 2/1982 Sakami et al. .................... 455/181

*Primary Examiner*—Vit W. Miska

*Attorney, Agent, or Firm*—Daryl C. Josephson

[57] ABSTRACT

A Radio Alarm Clock With Reminder Capability provides an electronic alarm clock with message storing, editing, displaying and scheduling and an audio receiver that can be triggered by an alarm and used independently. Conventional controls and displays, standard message selection, and default settings accommodate the less sophisticated user of a beside alarm clock. Manual and automated data protection accommodate the less coherent awakening user of a bedside alarm clock by changing key functions to a conventional sleep function. Nonvolatile storage and a battery low warning protect stored data from power outages. Multiple alarm and speaker capabilities, along with an audio balance adjust remote control accommodate multiple users. Receiver independent operation, multiple speakers, a separate audio display, conventional control and an auxilliary audio input further provide a versitile sound system capability.

13 Claims, 11 Drawing Sheets

RADIO ALARM CLOCK WITH REMINDER CAPABILITY

BACKGROUND OF THE INVENTION

1. Field of Invention

The invention relates to messaging electronic timepieces in general and radio alarm clocks with personal reminder scheduling in particular.

2. Description of the Prior Art

Electronic personal data recording devices having the ability to store, recall, edit and display related data are well known as application-specific adaptations of personal computers running Database Management Systems (DBMS) software. Such devices are typically directed at very specific and narrowly defined applications such as electronic telephone books. The personal, important nature of the stored data and device sophistication require that users of such devices be specifically and narrowly defined based upon the particular target application. With the functional expansion of these devices to include event scheduling, tracking and other timepiece-related features, either the devices, users or both have necessarily become even more specifically and more narrowly defined. This application-driven characteristic has become so critical that intended users must now be separated as "programmers" or "users of the information"; the frequency with which data is input and edited or "programmed" must also be considered. Whether or not cost is a primary concern also relates to the application-based need for the device by specific user groups.

One example is the Programmable Event Reminder apparatus set forth in Wood, U.S. Pat. No. 5,097,429. While this adaptation can be used as a timepiece, its primary functional, operational and user requisites are specifically and narrowly tailored for reminding an "information user" when medication is to be taken. The device operation can and should therefore be realized with different persons acting as programmer activator versus information user. Thus the sophistication and coherence required for programming and activation are immaterial so long as "information use" is essentially automatic. Cost is also a lesser consideration due to the inherent necessity of obtaining such a device.

Another example is the now common perssonal organizer. In this case, the application is one in which stored information relates to daily activities, contacts, phone numbers, etc. Timepiece functionality in particular is not of primary importance. Also, since the information is necessarily subject to constant change, programming functions must be easily accessable. In this case, it is expected that the programmer activator and information user may well be the same person. It is also expected that a purchaser of such a device has developed or is willing to develop the coherence and sophistication necessary to operate the device, keeping in mind that they necessarily have the capability to destroy important information. Finally, it is expected that such a purchaser is sufficiently persuaded by need or desire that cost, while one factor, is not of paramount importance.

Bedside alarm clocks are well known. In this case, the application involves providing a reliable alerting device that can be both programmed and used by a single person with little or no electronic device sophistication. In addition, the awakening information-user may well lack any appreciable level of coherence. While alarm clock related capability is the central concern, these devices have come to add a radio. The radio can be used for casual listening, but its application-driven purpose is to provide a single monaural alarm. So not only is fidelity not a primary concern, but changes in tuning, volume and other radio characteristics affect the waking radio alarm characteristics as well. In addition, message scheduling as an added, independent and non-interfering radio alarm clock capability has not been implimented nor suggested.

SUMMARY OF THE INVENTION

An object of the invention is to provide an Alarm Clock With Reminder Capability that is controlled and functions with the same or better reliability and in essentially the same manner as a conventional radio alarm clock, when used for that purpose. All other functionality, while highly integrated, cannot interfere with the clock or radio alarm clock functionality.

A second object of the invention is to provide a reminder capability that allows the user to store, edit and, at predetermined intervals, display messages in addition to and in a non-interfering way with radio alarm clock functionality. Such messages may be displayed periodically or once, at or prior to a specified date and of a typical or atypical nature.

A third object of the invention is to provide a radio capability that can be used for both conventional radio alarm clock functionality and, in addition, as an independent conventional stereo receiver amplifier. This independent functionality cannot interfere with any of the functionality described above.

A fourth object of the invention is to provide a means for controlling the Alarm Clock With Reminder Capability that is easily used by one person with no more sophistication or coherence than is typically enountered in users of traditional alarm clocks. This person may therefore act as both a programmer user and information user. In addition, this user may be in any of the lessened mental states typical of users of bedside alarm clocks and be predisposed to using typical alarm clocks.

A fifth object of the invention is to provide sufficient protection against accidentally damaged information as to accommodate the lack of coherence typical of awakened users of beside alarm clocks.

A sixth object of the invention is to provide multiiple, independently controllable alarms that can sound through selectable speakers. The alarms can therefore be used as period-specific alternatives or by multiple persons with different requirements and in separated locations; for example, at different sides of a bed.

A seventh object of the invention is to minimize the effort required for data input and editing.

These and other features, objects and advantages of the invention can best be understood by reference to the following description thereof together with the drawings.

DETAILED DESCRIPTION OF THE PREFERRED EMBODIMENT

Figure 1:
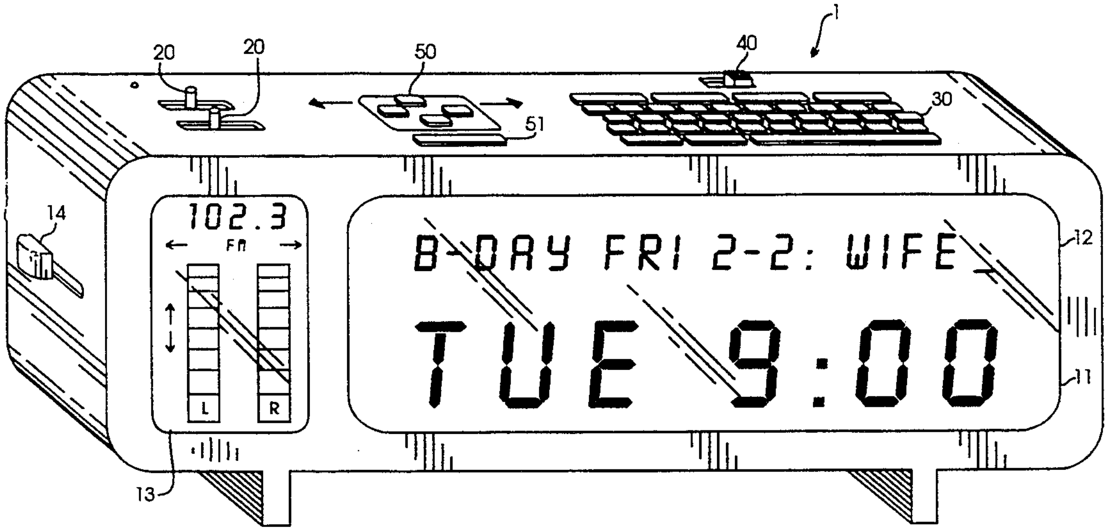
FIG. 1 is a perspective view of the "Alarm Clock With Reminder Capability".

Referring to the drawings, the present invention is shown generally in FIG. 1. Operational controls are detailed in FIGS. 2 through 4 and functional components are detailed in FIG. 5. Finally, operational characteristics are detailed in flow chart form in FIGS. 6 through 11*c*.

FIG. 1 shows how the Alarm Clock With Reminder Capability (Clock) 1 is configured such that it looks and can functions as a conventional radio alarm clock. Message storage, scheduling, editing and display, while highly integrated, is independently optimized and non-interruptive of the radio alarm functionality. Stereo receiver amplifier (radio) functionality, while supporting the radio alarm function, can also be used as an independent, conventional high fidelity sound system. Therefore, the day time display 11 is the most prominant display, followed by the message date menu display 12. The radio display 13 is separated. A display dimmer 14 ensures optimal viewing when placed on a nightstand as with a conventional alarm clock.

Figure 2:
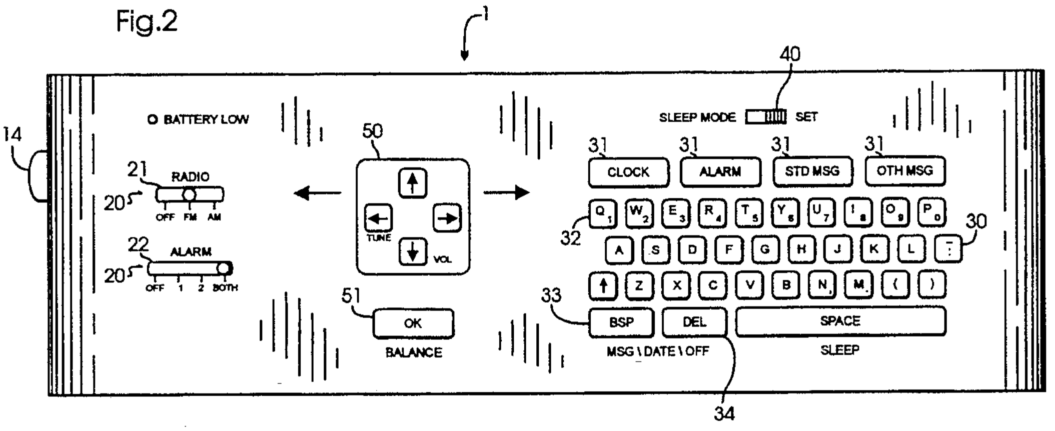
FIG. 2 is a top plan view thereof.
Figure 3:
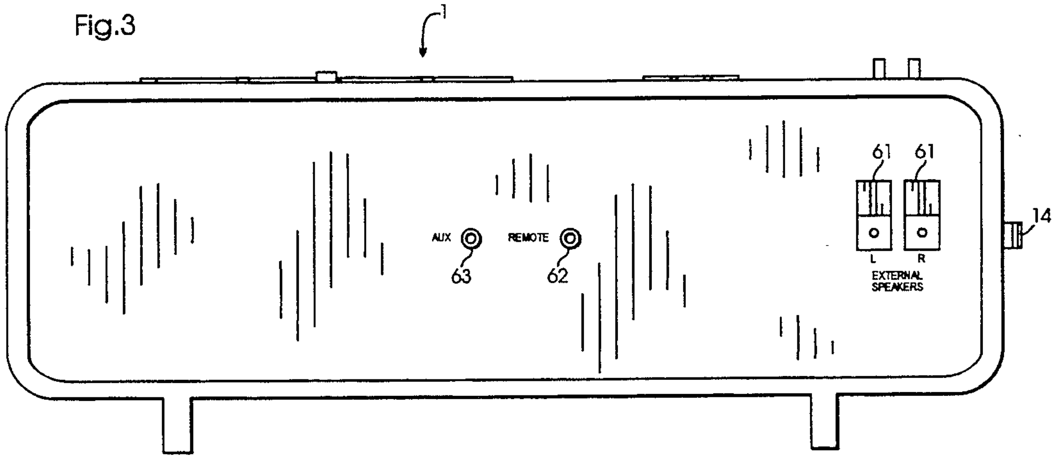
FIG. 3 is a back elevation view thereof.

The selection and positioning of high profile toggle switches 20, a low profile data entry keyboard 30 and data entry enable switch 40 emphasize coventional alarm clock operation and minimize the risk of unintentionally altering stored information. FIG. 2 shows that user control of the Clock 1 is consistant with that of a conventional radio alarm clock in a somewhat expanded form. The clock alarm, reminder and radio functions are independently accommodated according to their conventional equivalents. The radio on off switch 21 and alarm on off switch 22 are grouped separately. The data-entry keyboard 30 is grouped separately along with the data entry enable switch 40. Finally, an arrow pad 50 is placed between the above controls along with an OS balance key 51 to emphasize and facilitate their use along with either of the above control groupings.

To facilitate bedside use, the clock set, alarm set, preset and other message or "reminder" entry editing functions are all handled in a similar manner. First the data entry enable switch 40 must be moved to an enable or "set" position in order to enable any changes. Next, the approprate function selector switch 31 must be depressed to enable specific changes, thereby displaying the appropriate menu on the message date menu display 12 (FIG. 4) Finally, data and menu selections may be entered by typing on the keyboard 30 and or using the arrow pad 50 and OK balance key 51. All changes are reflected as is appropriate using the day-time display 11, message date menu display 12 and the radio display 13.

Figure 6:
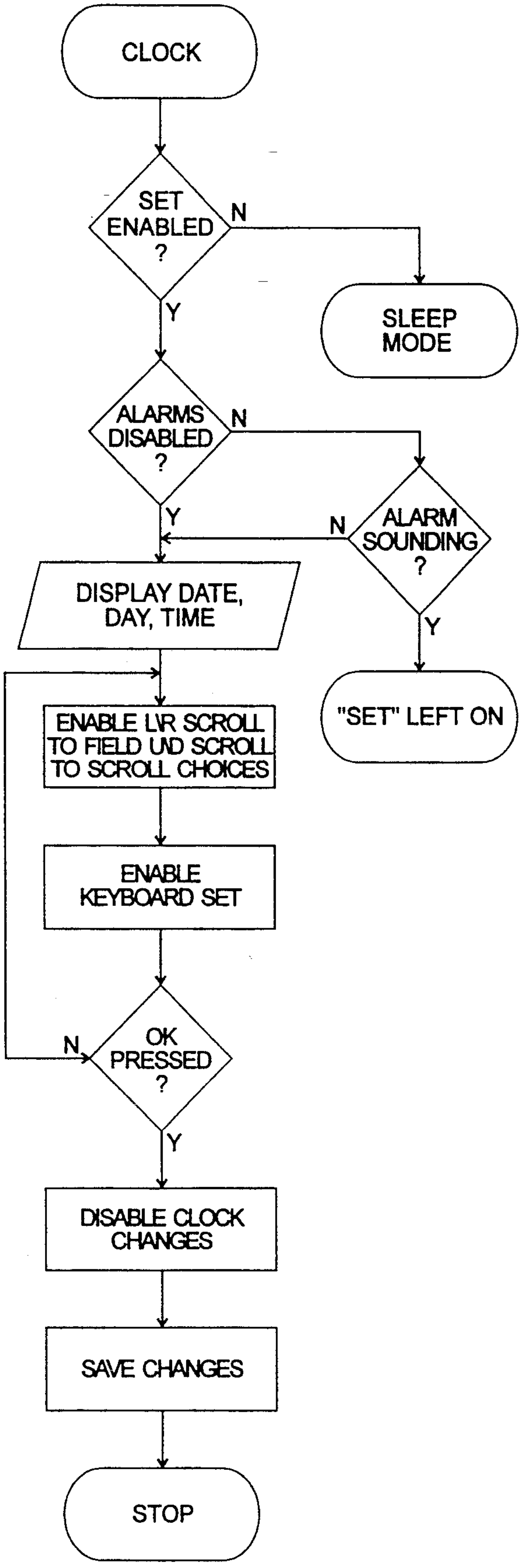
FIG. 6 is a flow chart showing a clock setting method having disable, timeout and preemption protection against inadvertant changes.

The clock functionality can be set in a conventional manner. Scrolling through options displayed on the day time display 11 and message date menu display 12 using the arrow pad 50 and typing on the keyboard 30 produce the same results. Both can be used to store the day of the week, time, month, date and year (FIG. 6).

Figure 5:
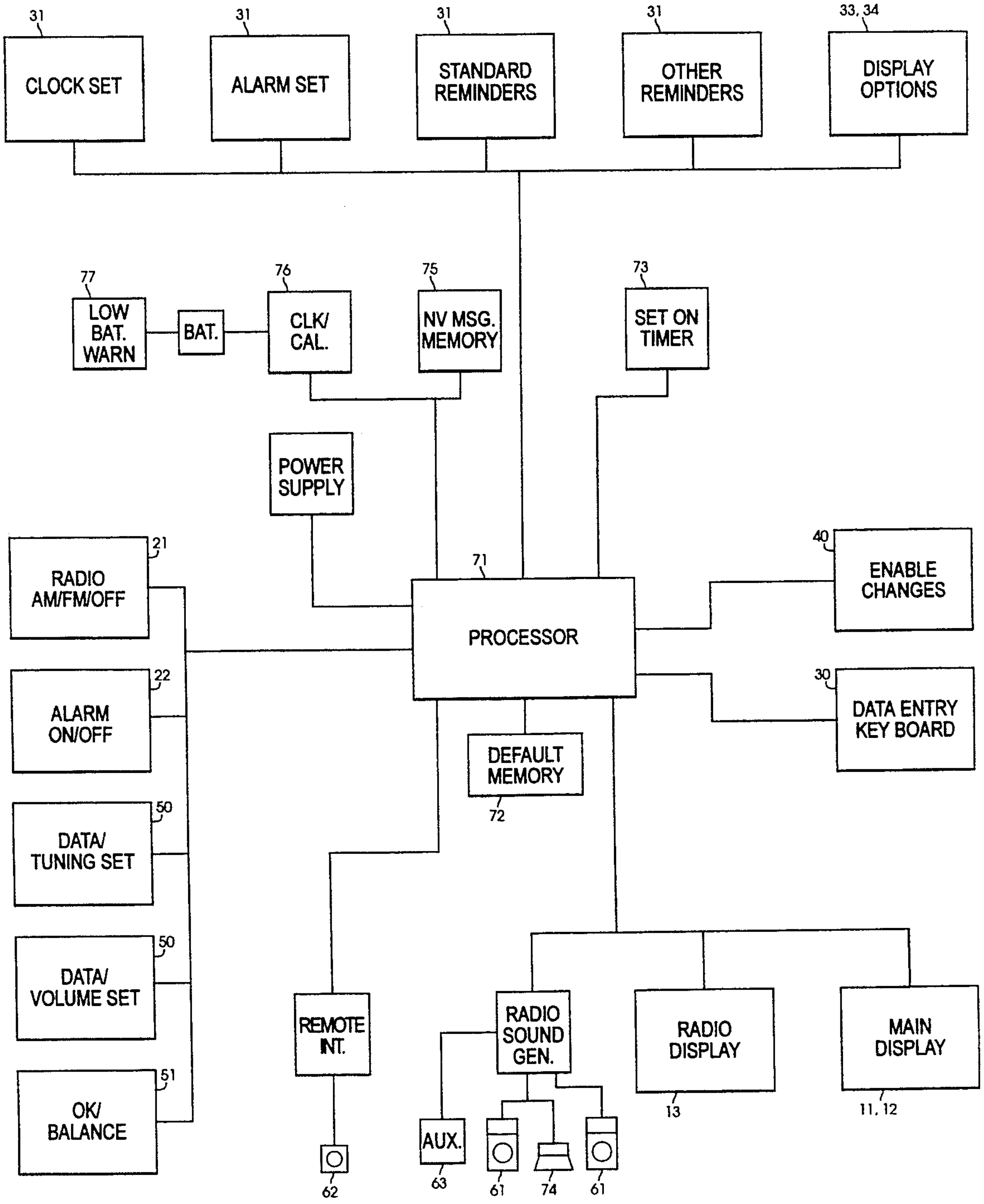
FIG. 5 is a functional diagram of the Alarm Clock With Reminder Capaability.
Figure 7:
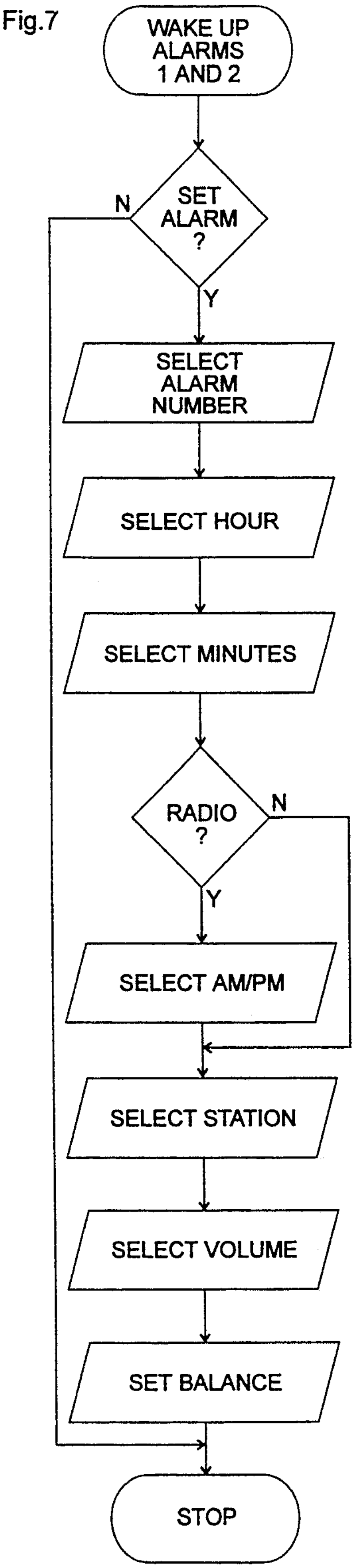
FIG. 7 is a flow chart showing an alarm setting method that accommodates two independent alarms.

The alarm functionality can also be set in a similarly conventional manner, however, while accommodating multiple alarms. In this case, the message date menu display 12 displays selectable options while the day-time display 11 is used to display selected settings. To accommodate typical user applications, the multiple alarms can be set in one of two ways. First, each alarm can be set to different times and day groupings. Second, each alarm can be set for different times only. The characteristics for each alarm can also be set independently (FIG. 7). If the radio is utilized, the station and volume may be set for each alarm using the arrow pad 50 for station and volume scrolling and the numbered keyboard keys 32 for storing and retrieving station presets. If the radio is not utilized, a sound generator with similar volume control is automatically selected. In addition, an external speaker may be connected to an auto-sensing speaker connector 61 (FIG. 5). When sensed by the Clock I during radio characteristic adjusting, the OK balance button 51, arrow pad 50 and radio display 13 can be used to balance sound volume. Thus one alarm may sound using the internal speaker 74 (FIG. 5) and a second alarm may sound using the external speaker. A second external speaker may also be connected for better fidelity.

Figure 8:
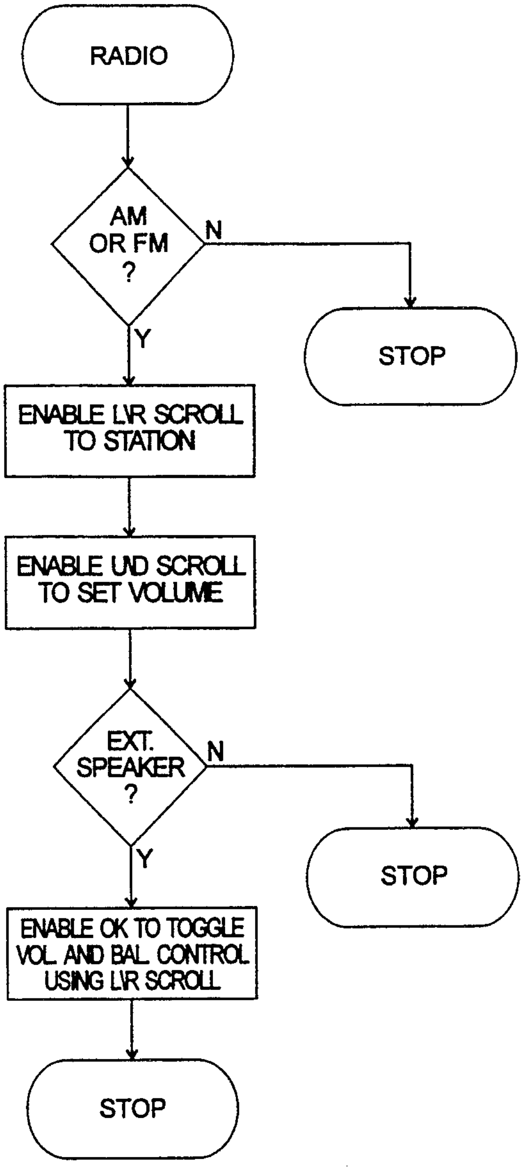
FIG. 8 is a flow chart showing a receiver amplifier setting method.
Figure 9A:
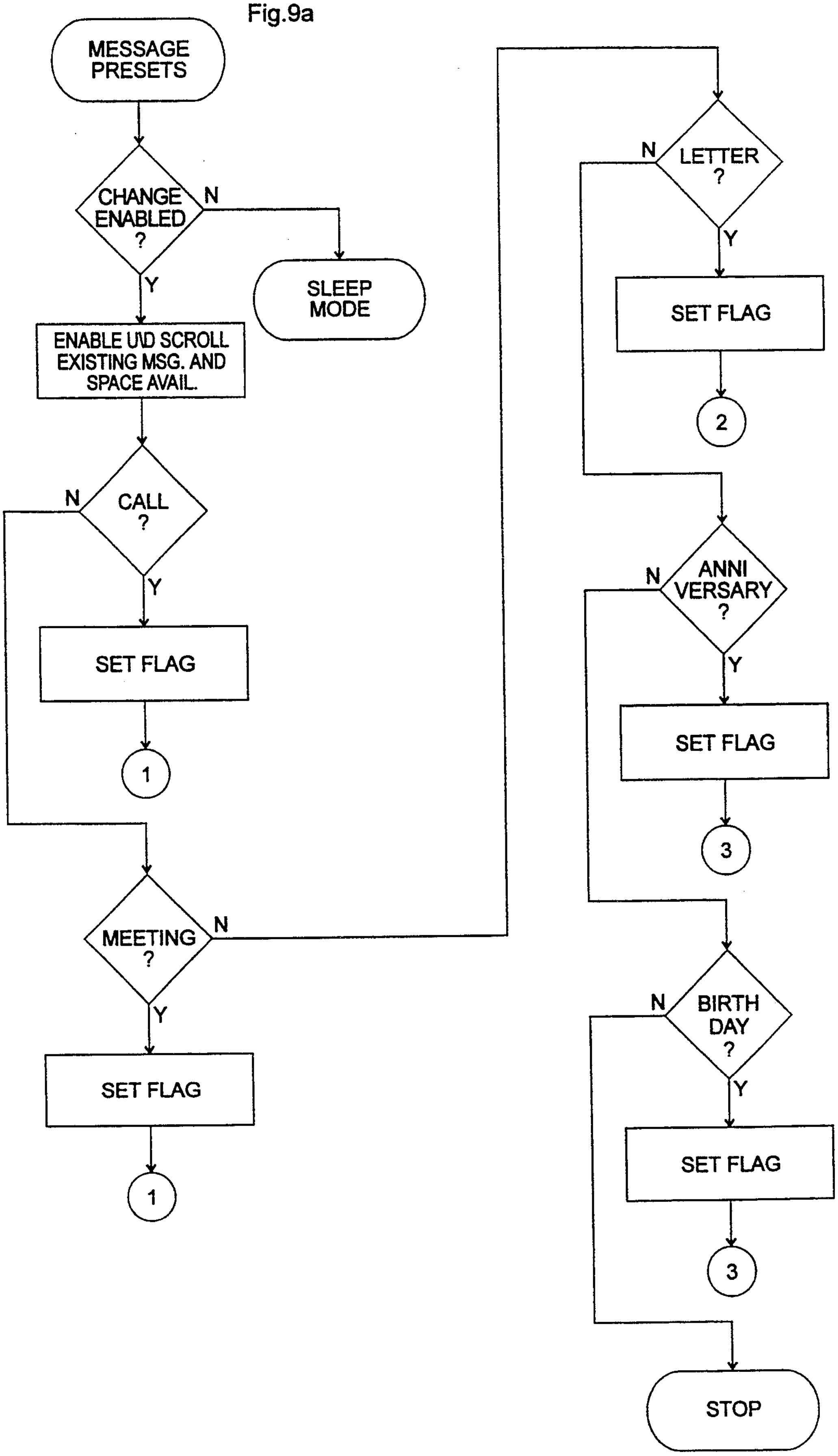
FIG. 9*a* is a flow chart showing a method for recording standard messages, having disable, timeout and preemption protection against inadvertant changes.
Figure 9B:
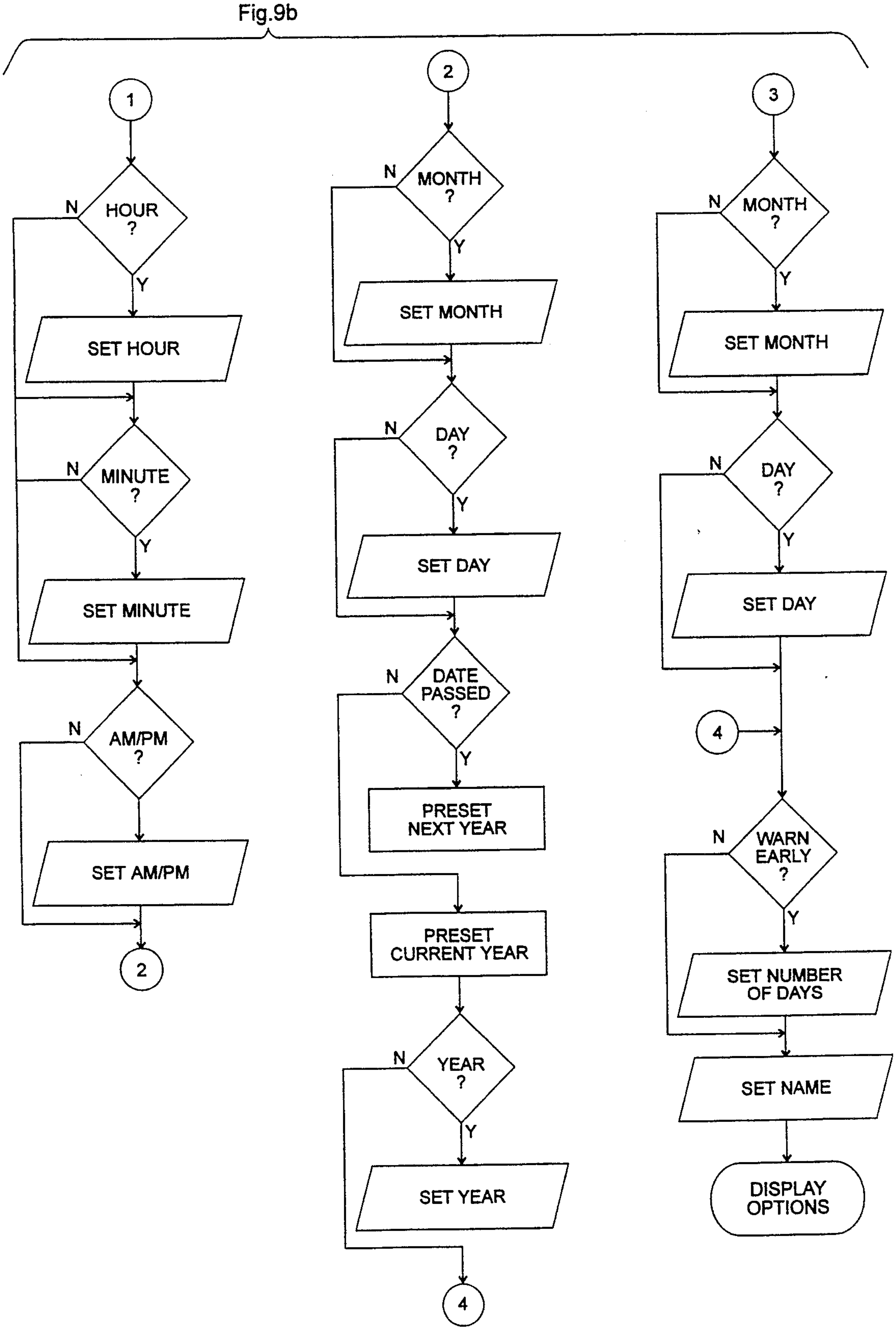
FIG. 9*b* is a flow chart showing further details of the standard message recording method.
Figure 10A:
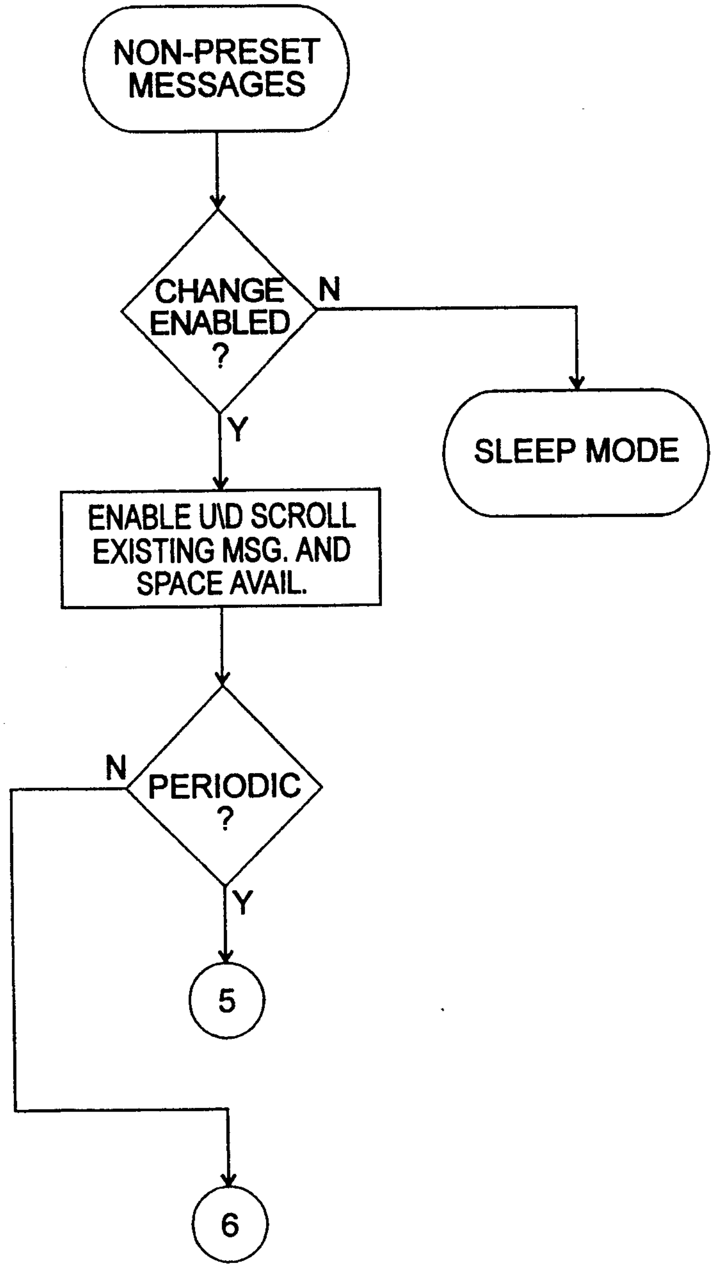
FIG. 10*a* is a flow chart showing a method for storing non-standard message, having disable, timeout and preemption protection against inadvertant changes.
Figure 10B:
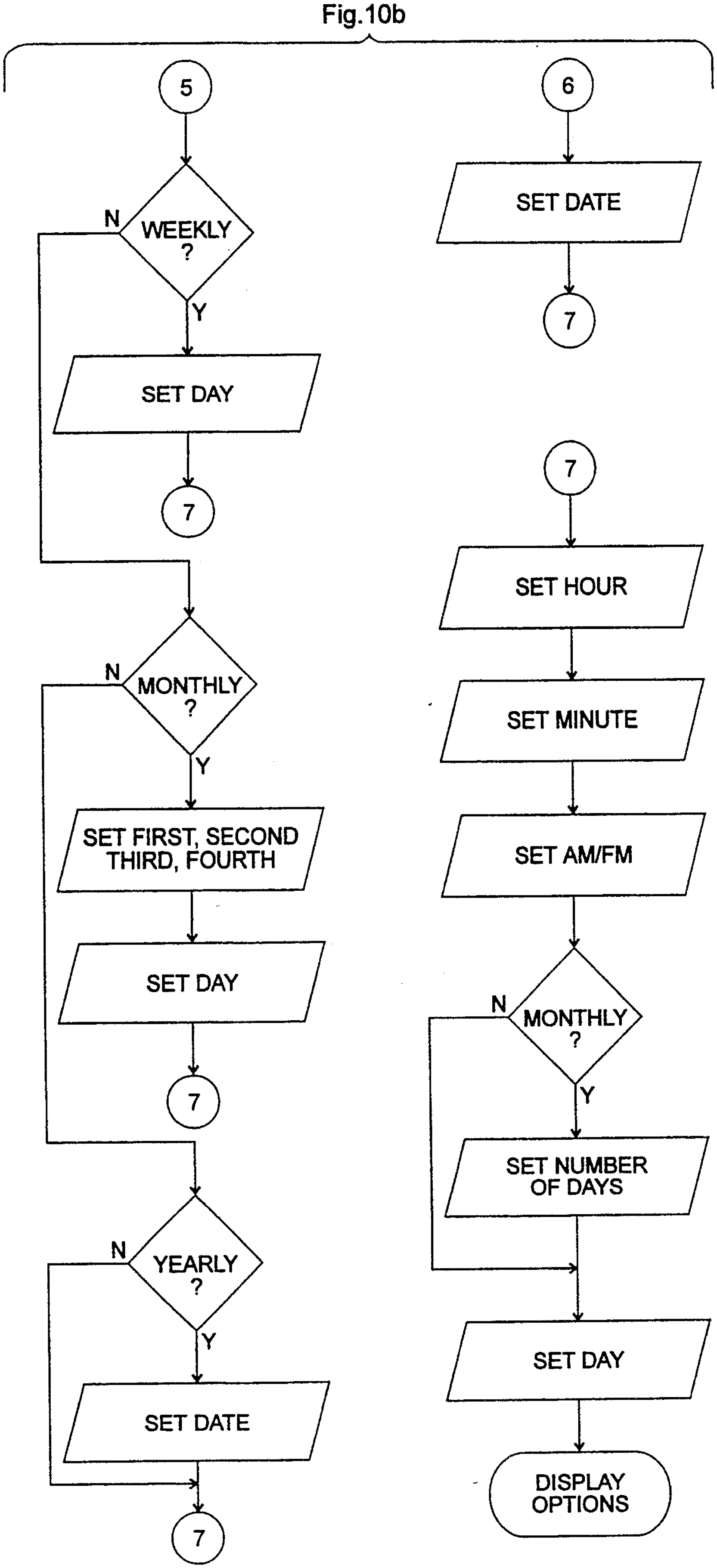
FIG. 10*b* is a flow chart showing further details of the non-standard message recording method

The radio may also be set for casual listening without interfering with alarm settings. The only operational differences are that balance adjustments in this case are typically made for fidelity reasons only and no alarm need be selected (FIG. 8).

Figure 4:
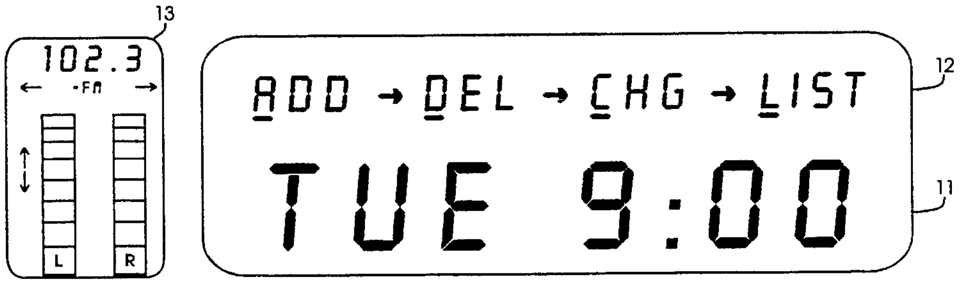
FIG. 4 is a front elevation view of the display showing an action prompting menu for storing, editing and reviewing reminder information.

The reminder functionality allows messages or "reminders" to be added, deleted, changed, listed and scheduled such that they are displayed upon awakening (FIG. 4). Standard messages may be scrolled, selected and completed using the arrow pad 50, OK balance key 51 and keyboard 30. Other non-standard messages may be similarly utilized (FIGS. 9*a* through 10*b*). Messages can be set for display on a single date, on a repetitive basis and on a user-determined number of days prior to a set date. The keyboard 30, arrow pad 50 and OK balance key 51 allow for conventional data entry.

A change disable or "sleep mode" functionality is provided to further accommodate users of varying sophistication and less coherent awakening users (FIGS. 2, 11*a*, 11*b* and 11*c*). The user may move the data entry enable switch 50 to the sleep mode position. If the user fails to do this, the Clock 1 will switch to sleep mode automatically in one of two ways: if the user fails to enter changes before a set on timer 73 (FIG. 2) times out; and if the alarm is sounding and for a timeout period thereafter. Sleep mode does not preempt casual radio listening or display options.

In addition to data protection, sleep mode sets the keyboard 30 to an alternate, sleep mode operation. This provides convention sleep mode operation while accommodating message display user preferences. BSP 33 and DEL 34 toggle the message date menu display 12 between displaying current messages, the current date and nothing. Other keyboard keys act as a conventional alarm clock sleep bar and the arrow pad 50 controls the radio 78 (FIG. 5).

All features are coordinated by a processor 71 and program instructions stored in a default memory 72 (FIG. 5).

Figure 11A:
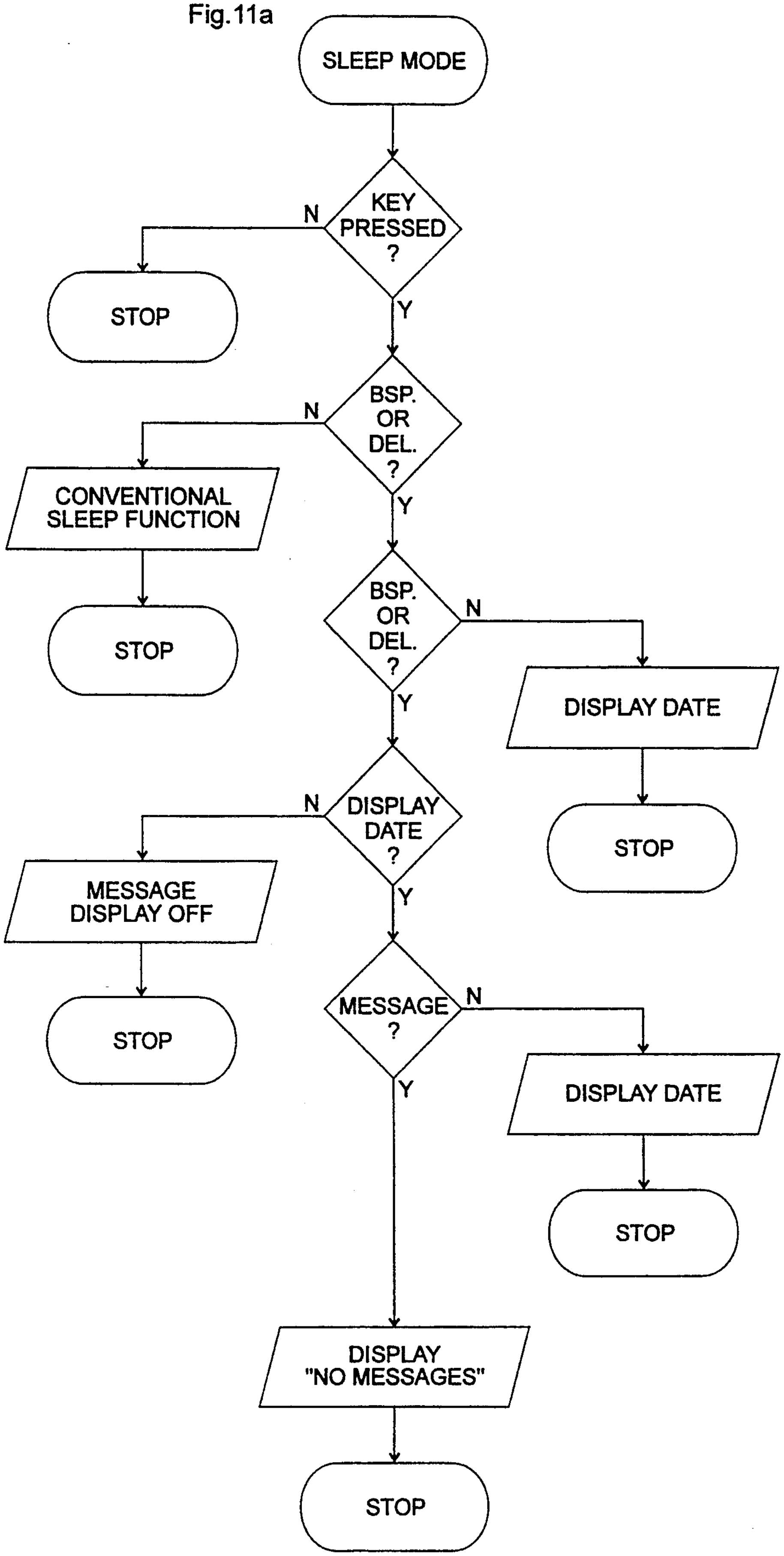
FIG. 11*a* is a flow chart showing keyboard input handling while changes are disabled.
Figure 11B:
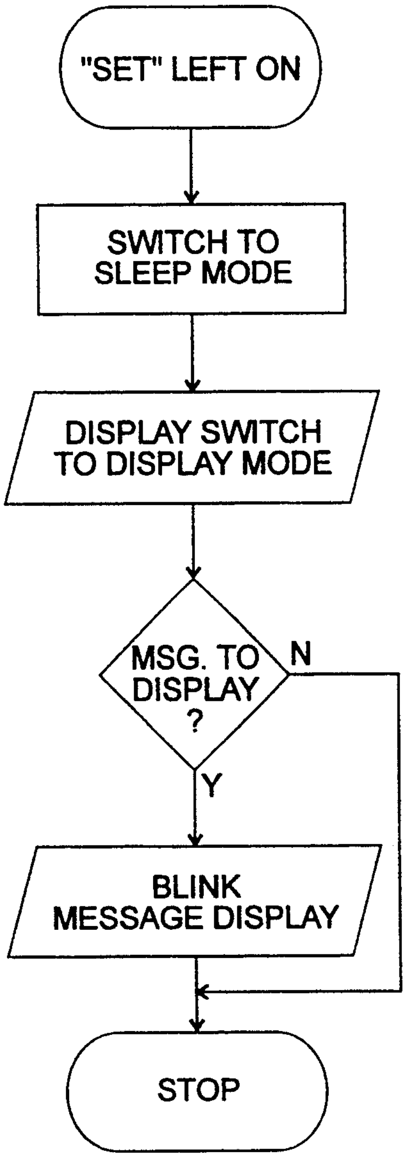
FIG. 11*b* is a flow chart showing the inadvertant change protection method.
Figure 11C:
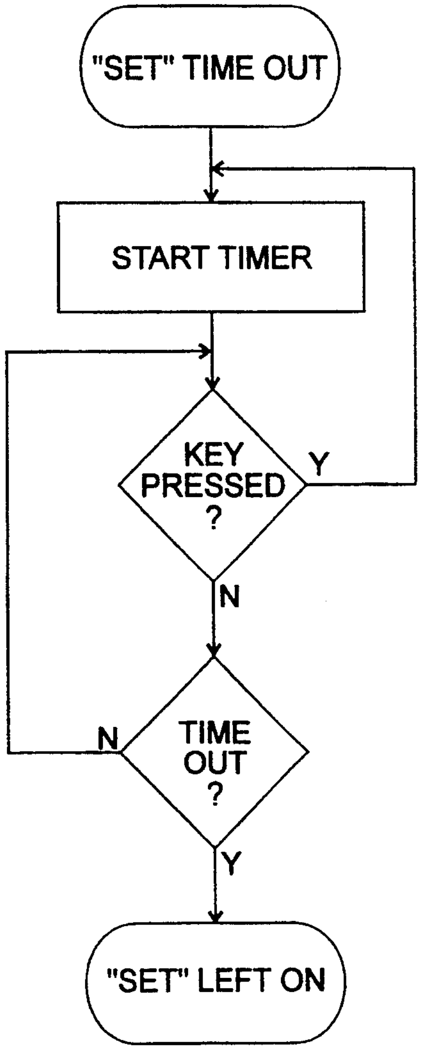
FIG. 11*c* is a flow chart showing details of the timeout method.

In addition to the features described above, other features are provided to accommodate the typically less coherent user and to minimize actual cost of the Clock 1. First, a blinking curser or date are used to indicate that current messages exist but are not being displayed (FIG. 11*a*). Second, multiple messages are displayed in a conventional scrolling fashion which may also be automated. Third, a remote connector 62 allows Clock 1 features, such as sleep, volume and alarm off, to be controlled by a second user not positioned near the Clock 1. Finally, the addition of nonvolatile message memory 75, a battery backed clock calendar 76 and a battery low warning 77 (FIGS. 1 and 5) minimize the risk of data loss due to power outages.

While the above description contains many specificities, these should not be construed as limitations on the scope of the invention, but rather as an example of the preferred embodiment thereof. Many other variations are possible.

One example is to provide a more functionally independent compliment of controls. For example, radio control can be removed from the arrow pad 50, OK button 51 and numbered keyboard keys 32 and independent controls added for these functions. Alarm on off control can be similarly subdivided for each alarm. A second example is to expand the alarm-independent, receiver amplifier capabilities, including but not limited to adding multi-channel surround sound, other stereo components, a headphone jack and a sleep timer. The independent radio display 13 can also accommodate display of various conventional receiver amplifier characteristics.

A third example is to expand the multiple alarm capability by adding additional alarms, possibly additional speakers and a multi-channel balance control.

A fourth example is to replace the textural message date menu display 12 with a color graphic display. Such a display more completely accommodates the lowered coherence of awakened users by displaying messages pictorally. However, such a display is more costly.

A fifth example is to replace the nonvolatile message memory 75 with less costly memory backed by a battery.

Finally, not all functional characteristics must be present. Similar permutations providing the alarm clock, radio and messaging capabilities are contemplated.

I claim:

1. An Alarm Clock With Reminder Capability comprising:

an alarm clock having a clock data means for inputting clock data, the clock data comprising current time, day of the week, month, date and year, the alarm clock also having an alarm data input means for inputting alarm data, the clock data input means and the alarm data input means being similar to that of a conventional bedside alarm clock;

an alarm enable input means for enabling a plurality of integral alarms, each alarm having an alarm enabled state and an alarm disabled state;

a message data input means for inputting message data, the message data comprising user message data, default message data and message schedule data;

an audio receiver having integral programmable components, the components comprising an am fm radio, a sound generator and an audio amplifier, the audio receiver also having a receiver input means for inputting receiver data and a plurality of audio outputs for outputting audio data, such that the audio receiver can be used independently as both an alarm and a conventional audio component;

a plurality of internal audio speakers connected to audio outputs of the audio receiver for broadcasting audio data received from an audio outputs;

a plurality of display means for displaying clock data, alarm data, message data, message scheduling data, receiver data and default data; the default data comprising default message type data, user prompt menu data, default attribute data and program data;

a plurality of change disable means for preventing inadvertant data and control input, the change disable means having a change enable state wherein the clock data input, alarm data input and message data input are enabled and a change disable state wherein the clock data input, alarm data input and message data input are disabled;

a plurality of blackout protection means for preventing the loss of data due to primary power interruption;

a default memory means having a plurality of default data memory regions, the default data memory regions containing default data;

an alarm data memory means having a plurality of alarm data memory regions for storing alarm data input by the alarm data input means and corresponding radio data input by the radio data input means;

a message data memory means for storing the message data, default message type data and message schedule data input by the message data input means; and a coincidence detection means for detecting alarm schedule data that is identical to corresponding clock data and for each alarm enabled state, inputting the corresponding radio data to the radio data input means, also for detecting message schedule data that corresponds with clock data and inputting the corresponding data to tile display data input means.

2. A Radio Alarm Clock With Reminder Capability as in claim 1 wherein the blackout protection means are selected from tile group consisting of nonvolatile memory and volatile memory with battery backup.

3. A Radio Alarm Clock With Reminder Capability as in claim 1 wherein the change disable means comprises a conventional enable and disable switch.

4. A Radio Alarm Clock With Reminder Capability as in claim 3 wherein the change disable means further comprises a timeout means for automatically selecting the change disable state when a user the enable and disable switch remains in an change enable state for a predetermined period without user input of data selected from the group consisting of clock data, alarm data and message data.

5. A Radio Alarm CLock With Reminder Capability as in claim 3 or claim 4 wherein the change disable means further comprises a preemption means for automatically selecting the change disable state for a period of time commensurate with an alarm being broadcast.

6. A Radio Alarm Clock With Reminder Capability as in claim 1 wherein connecting a plurality of conventional audio speakers to the audio receiver can be used to replace and be used in conjunction with the internal speakers.

7. A Radio Alarm Clock With Reminder Capability as in claim 1 wherein conventional audio components can be connected to the receiver input, thereby sending audio data to the audio receiver.

8. A Radio Alarm Clock With Reminder Capability as in claim 1 wherein the clock data input means, alarm data input means, message data input means and receiver input means comprise a conventional data input keyboard and a conventional data input number pad.

9. A Radio Alarm Clock With Reminder Capability as in claim 8 wherein the data input keyboard has a plurality of function keys, the function keys corresponding to the clock data input means, the alarm data input means, the message data input means and a standard data input means thereby providing the user with a means for selecting a desired data change type.

10. A Radio Alarm Clock With Reminder Capability as in claim 8 or claim 9 wherein the clock data input means, alarm data input means, message data input means and receiver input means further comprise a data accept key.

11. A Radio Alarm Clock With Reminder Capability as in claim 1 further comprising a remote control data input means for remotely inputting remote data, the remote data comprising alarm on/off data and receiver data.

12. A Radio Alarm Clock With Reminder Capability as in claim 1 wherein the clock input means, alarm input means and message input means while in a disabled state operate as a sleep bar on a conventional alarm clock and a display selection control, the display selection control toggling a display among viewing options, the viewing options comprising current message data, current date and a blank display.

13. A Radio Alarm Clock With Reminder Capability as in claim 12 wherein viewing options preempting message display will cause a warning means to be displayed, thereby alerting a waking user that a current message exists.

* * * * *